United States Patent
Cimini, Jr. et al.

(10) Patent No.: US 7,558,282 B2
(45) Date of Patent: *__Jul. 7, 2009__

(54) OFDM COMMUNICATION SYSTEM AND METHOD HAVING A REDUCED PEAK-TO-AVERAGE POWER RATIO

(75) Inventors: Leonard Joseph Cimini, Jr., Howell, NJ (US); Nelson Ray Sollenberger, Farmingdale, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/685,028

(22) Filed: Mar. 12, 2007

(65) Prior Publication Data

US 2007/0153932 A1  Jul. 5, 2007

Related U.S. Application Data

(63) Continuation of application No. 11/190,308, filed on Jul. 26, 2005, now Pat. No. 7,206,317, which is a continuation of application No. 09/778,254, filed on Feb. 7, 2001, now Pat. No. 6,928,084.

(60) Provisional application No. 60/192,708, filed on Mar. 28, 2000.

(51) Int. Cl.
  *H04Q 11/02*   (2006.01)
  *H04L 12/56*   (2006.01)

(52) U.S. Cl. .................. 370/430; 370/481; 375/222

(58) Field of Classification Search ............ 370/430, 370/206, 545, 441, 442, 203, 342, 481; 375/130, 375/146, 220–222
See application file for complete search history.

(56) References Cited

U.S. PATENT DOCUMENTS

| | | | |
|---|---|---|---|
| 5,914,933 A | 6/1999 | Cimini et al. | 370/208 |
| 6,005,840 A | 12/1999 | Awater et al. | 370/206 |
| 6,044,103 A * | 3/2000 | Weaver, Jr. | 375/130 |
| 6,125,103 A | 9/2000 | Baumi et al. | 370/203 |
| 6,175,551 B1 | 1/2001 | Awater et al. | 370/210 |
| 6,301,268 B1 | 10/2001 | Laroia et al. | 370/481 |
| 6,314,146 B1 | 11/2001 | Tellado et al. | 370/346 |
| 6,363,060 B1 | 3/2002 | Sarkar | 370/342 |
| 6,366,555 B1 | 4/2002 | Gatherer et al. | 370/210 |
| 6,449,246 B1 | 9/2002 | Barton et al. | 370/210 |

(Continued)

FOREIGN PATENT DOCUMENTS

EP   0 735 731 A2   10/1996

(Continued)

OTHER PUBLICATIONS

Muller, et al, "A Novel Peak Power Reduction Scheme for OFDM", pp. 1090-1094, Sep. 1997.

(Continued)

*Primary Examiner*—John Pezzlo

(57) ABSTRACT

An OFDM system embeds sequence information in the transmitted signal that reduces peak average power ratio (PAP) with minimal impact on the overall system efficiency. A marker is embedded onto the transmitted information that is used to identify the combining (inversion) sequence at the receiver. In one embodiment, selected tones in a cluster are rotated when the corresponding phase factor rotates the cluster.

8 Claims, 6 Drawing Sheets

U.S. PATENT DOCUMENTS

| | | | |
|---|---|---|---|
| 6,501,747 B1 | 12/2002 | Friedlander et al. | 370/342 |
| 6,556,557 B1* | 4/2003 | Cimini et al. | 370/342 |
| 6,721,349 B1* | 4/2004 | Willenegger et al. | 375/130 |
| 6,850,497 B1 | 2/2005 | Sigler et al. | 370/310 |
| 6,985,432 B1* | 1/2006 | Hadad | 370/203 |
| 2002/0172146 A1 | 11/2002 | Wu et al. | 370/208 |
| 2005/0002440 A1 | 1/2005 | Alamouti et al. | 375/141 |
| 2005/0141603 A1* | 6/2005 | Miller | 375/222 |

FOREIGN PATENT DOCUMENTS

| | | |
|---|---|---|
| EP | 0 942 566 A2 | 9/1999 |

OTHER PUBLICATIONS

Takada, et al. "Peak Power Suppression With Parity Carrier for Multi-Carrier Transmission", 1999 IEEE.

Lawrey, et al, "Peak To Average Power Ratio Reduction of OFDM Signals Using Peak Reduction Carriers", Parsa 22-25, Aug. 1999.

Zekri, et al, "DMT Signals With Low Peak-to-Average Power Ratio", Parsa. 362,368, Jul. 1999.

Goeckel, et al, "Increasing Diversity with Non-Standard Signal Sets in Wireless OFDM Systems", Parsa. 20-24, Sep. 1999.

U. Reimer; "Digital Video Broadcasting", IEEE Commun. Mag. vol. 36, No. 6, Jun. 1998; pp. 104-110.

L.J. Cimini, Jr., et al. "Advanced Cellular Internet Service," IEEE Commun. Mag., vol. 36, No. 10, Oct. 1998; pp. 150-159.

R. O'Neill, et al., "Envelope Variations and Spectral Splatter in Clipped Multicarrier Signals," Proc. Of PIMRC '95; pp. 71-75.

X. Li, et al, "Effects of Clipping and Filtering on the Performance of OFDM," IEEE Commun. Letts., vol. 2, No. 5, May 1998; pp. 131-133.

A.E. Jones, et al., "Block Coding Scheme for Reduction of Peak to Man Envelope Power Ratio of Multicarrier Transmission Scheme," Elec. Letts., vol. 30, No. 25, Dec. 1994; pp. 2098-2099.

R.D.J. van Nee, "OFDM Codes for Peak-to-Average Power Reduction and Error Correction," Proc. Of Globecom '96; pp. 740-744.

S.H. Muller, et al., "OFDM with Reduced Peak-Average Power Ratio by Optimum Combination of Partial Transmit Sequences," Elec. Letts., vol. 33, No. 5, Feb. 1997; pp. 368-369.

L.J. Cimini, Jr., et al. Peak-to-Average Power Ratio Reduction of an OFDM Signal Using Partial Transmit Sequences, Proc. Of ICC '99. (Also to appear IEEE Commun. Letts. Mar. 2000), pp. 511-515.

EP Search Report of EP 01 10 6385.6, Dated Oct. 24, 2003, 2 pages; and 3 references cited therein.

* cited by examiner

OFDM COMMUNICATION SYSTEM AND METHOD HAVING A REDUCED PEAK-TO-AVERAGE POWER RATIO

CROSS REFERENCE TO RELATED APPLICATIONS

This application is a continuation of U.S. patent application Ser. No. 11/190,308 filed Jul. 26, 2005, now U.S. Pat. No. 7,206,317, which is a continuation of U.S. patent application Ser. No. 09/778,254 filed Feb. 7, 2001, now U.S. Pat. No. 6,928,084, which claims the benefit of U.S. Provisional Application No. 60/192,708, filed on Mar. 28, 2000. The aforementioned related patent applications are herein incorporated by reference.

STATEMENT REGARDING FEDERALLY SPONSORED RESEARCH

Not Applicable.

FIELD OF THE INVENTION

The present invention relates generally to communication systems and, more particularly, to Orthogonal Frequency Division Multiplexing (OFDM) wireless communication systems.

BACKGROUND OF THE INVENTION

Orthogonal frequency division multiplexing (OFDM) wireless communication systems have desirable characteristics for high-bit-rate transmission in a radio environment. For example, by dividing the total bandwidth into many narrow subchannels, which are transmitted in parallel, the effects of multipath delay spread can be minimized. OFDM systems have been adopted or proposed for Digital Audio Broadcasting, Digital Terrestrial Television Broadcasting, wireless LANs, and high-speed cellular data.

One disadvantage of using OFDM techniques for wireless applications is the potentially large peak-to-average power ratio (PAP) characteristic of a multicarrier signal with a large number of subchannels. For example, a baseband OFDM signal with N subchannels has a PAP equal to the number of subchannels squared divided by the number of subchannels, i.e., $PAP=N^2/N=N$. For $N=256$, the $PAP=24$ dB. When passed through a nonlinear device, such as a transmit power amplifier, the signal may suffer significant spectral spreading and in-band distortion.

Conventional solutions to reducing the PAP for OFDM systems include using a linear amplifier and using a nonlinear amplifier while backing off the amplifier operating point. However, these approaches result in a significant power efficiency penalty.

Another attempt to reduce the PAP includes deliberately clipping the OFDM signal before amplification to improve the PAP at the expense of some performance degradation. Another technique uses nonlinear block coding, where the desired data sequence is embedded in a larger sequence and only a subset of all the possible sequences are used, specifically those with low peak powers. Using this approach, a 3 dB PAP can be achieved with a relatively small bandwidth penalty. However, to implement such a coding scheme, large look-up tables are required at the transmitter and the receiver, thereby limiting its usefulness to applications with a small number of subchannels. Progress has been made toward coding schemes that reduce the PAP and can be implemented in a systematic form with some error-correcting capabilities. Nevertheless, these methods are difficult to extend to systems with more than a few subchannels and the coding gains are relatively small for adequate levels of redundancy.

Additional techniques for improving the statistics of the PAP of an OFDM signal include selective mapping (SLM) and partial transmit sequence (PTS). In SLM, a predetermined number M of statistically independent sequences are generated from the same information and the sequence with the lowest PAP is chosen for transmission. However, this introduces additional complexity for providing improved PAP statistics for the OFDM signal. In addition, the receiver must have knowledge about the generation process of the transmitted OFDM signal in order to recover the information. The sequence information is sent as side information, resulting in some loss of efficiency.

It would, therefore, be desirable to provide an OFDM system having a reduced PAP with optimal efficiency.

SUMMARY OF THE INVENTION

The present invention provides an OFDM system that embeds PAP-reducing inversion sequence information in the transmitted signal with no additional overhead. With this arrangement, the PAP ratio of the transmitted signals is reduced with little or no impact on the overall system efficiency. While the invention is primarily shown and described in conjunction with an OFDM system, it is understood that the invention is applicable to other systems in which it is desirable to detect embedded sequence information.

In one aspect of the invention, in an OFDM system a block of symbols is partitioned into a predetermined number of clusters. A respective phase factor is generated for each cluster to form an inversion sequence that reduces the PAP of the transmitted signals. A variety of techniques can be used to generate the inversion sequence including suboptimal iterative algorithms and optimum approximations, which can correspond to Walsh sequences for example. The inversion sequence is embedded onto the transmitted data by rotating selected ones of the tones in a cluster based upon whether the cluster phase factor rotates the cluster. In one embodiment, binary phase factors, i.e., plus/minus one, are used. If the inversion sequence does not rotate the cluster, i.e., the cluster phase factor is plus one, then none of the tones in the cluster are rotated. If the inversion sequence does rotate the cluster, i.e., the cluster phase factor is minus one, then every other tone in the cluster is rotated by a predetermined amount, e.g., $\pi/4$ radians.

To detect the inversion sequence, the receiver first removes the data modulation. A test statistic is then generated for each cluster. The test statistics can be used to make decisions in a variety of ways including quantizing the test statistic and making independent decisions for each cluster, quantizing the test statistics and decoding the entire sequence by nearest Hamming distance, and decoding the sequence by nearest Euclidean distance.

BRIEF DESCRIPTION OF THE DRAWINGS

The invention will be more fully understood from the following detailed description taken in conjunction with the accompanying drawings, in which.

DETAILED DESCRIPTION OF THE INVENTION

The present invention provides a technique for achieving high-bit-rate wireless data transmission in an orthogonal frequency division muliplexing (OFDM) system with a relatively low peak-to-average power ratio (PAP). The system utilizes partial transmit sequences for providing favorable PAP statistics with combining sequence information embedded in the transmitted data. With this arrangement, no overhead is required to provide the combining sequence information to the receiver.

Figure 1:
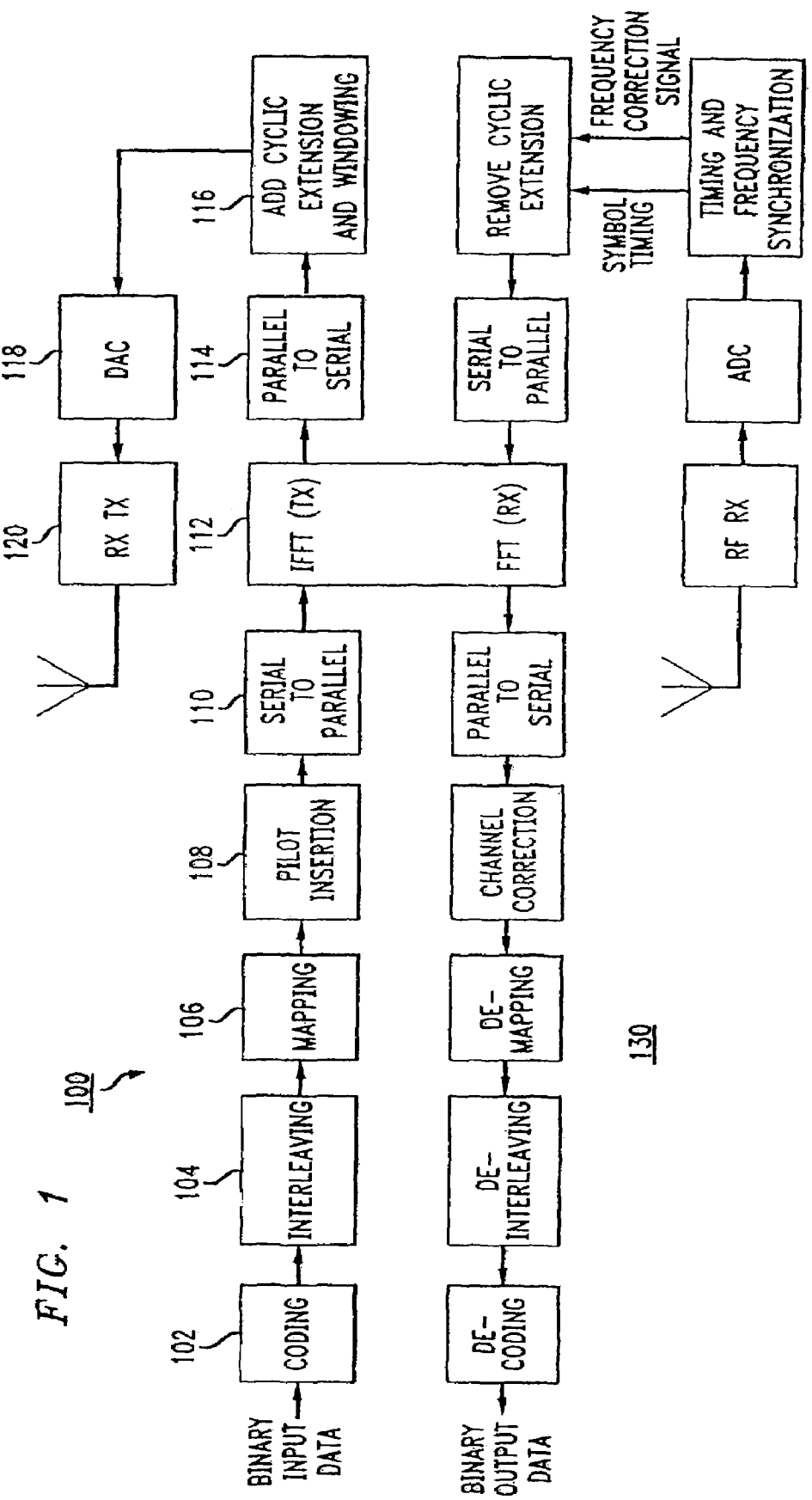
FIG. 1 is a top level diagram of an OFDM system having reduced PAP in accordance with the present invention.

FIG. 1 shows an exemplary OFDM system 100 having sequence data embedded in the transmitted data in accordance with the present invention. The system 100 includes components for transmission and reception of data. A coding subsystem 102 encodes binary data from a data source. The coded data is interleaved by an interleaving subsystem 104 and then mapped onto multi-amplitude multi-phase constellation symbols by a mapping subsystem 106. In one particular embodiment, the multi-amplitude multi-phase constellation symbols include quadrature phase shift keying (QPSK) symbols. Pilot signals can then be inserted by a pilot insertion subsystem 108 to estimate the channel at the remote subscriber unit receivers. A serial-to-parallel conversion subsystem 110 converts the serial data stream to a parallel data stream that is provided to an inverse fast fourier transform (IFFT) subsystem 112.

The transformed data is converted to serial data stream by a parallel-to-serial converter 114. Cyclic extension and windowing can be added by a subsystem 116 prior to digital-to-analog conversion by a DAC 118 and transmission by an antenna 120 system. A receive portion 130 of the OFDM system includes corresponding components for extracting the data from the received OFDM signal.

Figure 2:
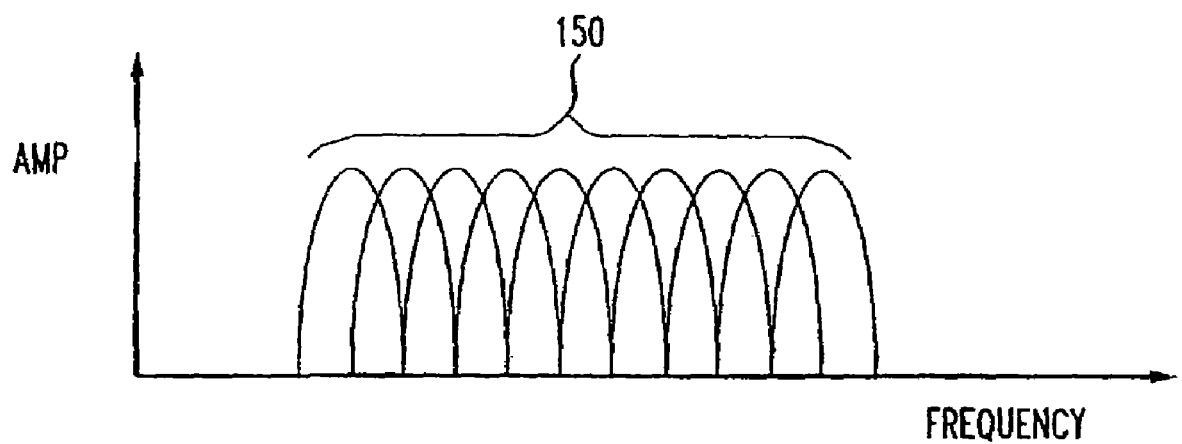
FIG. 2 is a pictorial representation of OFDM subcarriers that can be generated by the OFDM system of FIG. 1.
Figure 3:
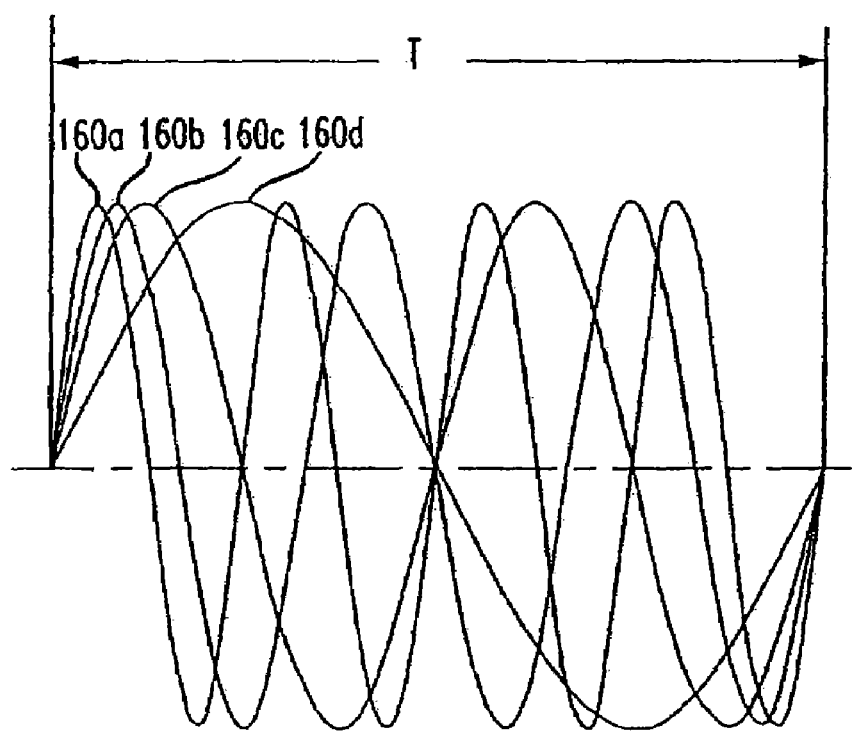
FIG. 3 is a pictorial representation of orthogonal OFDM subcarriers that can be generated by the OFDM system of FIG. 1.

As shown in FIG. 2, the OFDM system 100 utilizes an overlapping orthogonal multicarrier modulation technique having a plurality of subcarriers 150. FIG. 3 shows the orthogonal relationship of the subcarriers. More particularly, each of four subcarriers 160a-160d of one OFDM data symbol has an integral number of cycles in the interval T. The number of cycles between adjacent subcarriers differs by one.

Figure 4:
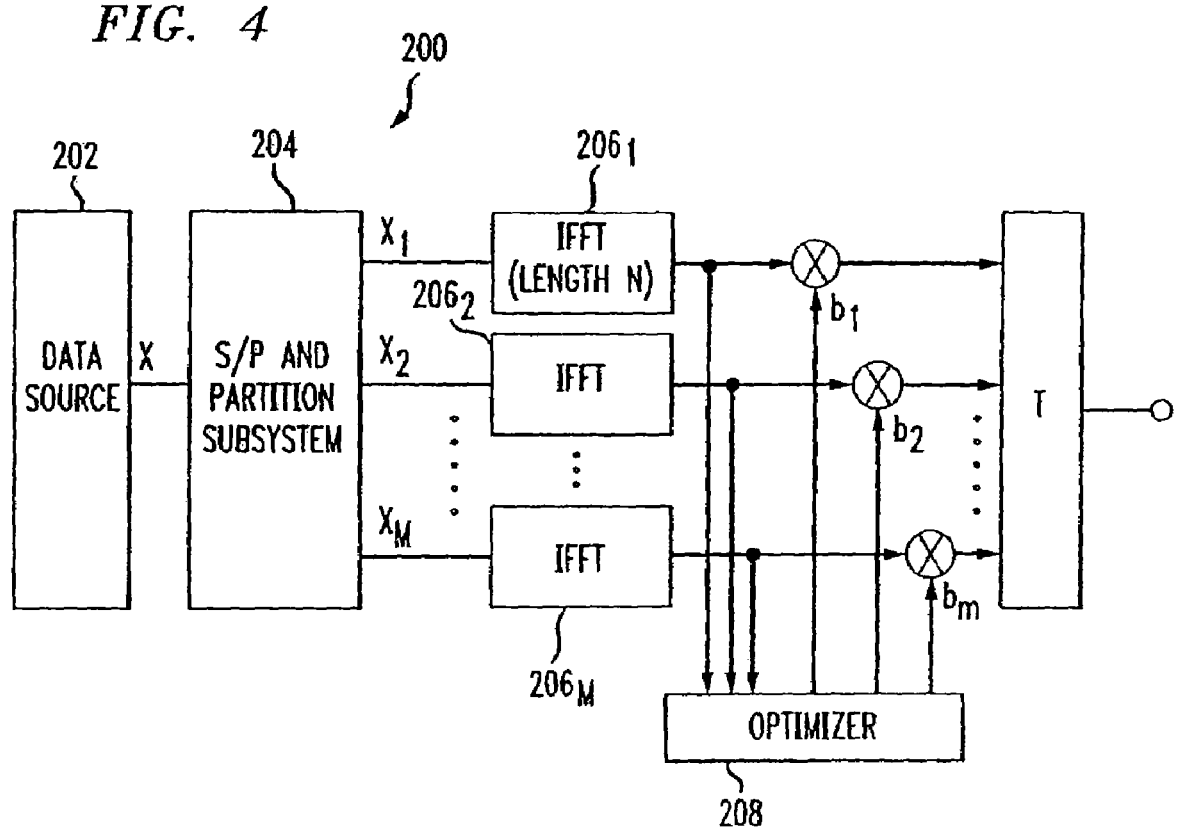
FIG. 4 is a schematic representation of a portion of an OFDM system that embeds inversion sequence information in the transmitted signals in accordance with the present invention.

FIG. 4 shows a portion of an OFDM system 200 that embeds PAP-reducing inversion sequence information within the transmitted data with no overhead in accordance with the present invention. With this arrangement, the need to dedicate reference subcarriers, e.g., one for each cluster, to transmit phase factor information is eliminated.

The OFDM system 200 includes a data source 202 generating a data stream X that is converted from a serial stream to a plurality of parallel data streams $X_1$-$X_M$ and partitioned by a subsystem 204 as described below. The partitioned data streams are transformed by respective inverse fast Fourier transform systems $206_1$-$206_M$, in a conventional manner. The clusters of transformed data are rotated by respective phase factors $b_1$-$b_m$, which are embedded into the transmitted data, as described below in detail. An optimizer subsystem 208 can facilitate selection of the phase factors that reduce the PAP ration of the transmitted OFDM signals.

Initially, a block of N symbols $\{X_n, n=0, \ldots, N-1\}$ is formed with each symbol modulating one of a set of N subcarriers, $\{f_n, n=0, 1, \ldots, N-1\}$. The N subcarriers are chosen to be orthogonal, i.e., $f_n=n\Delta f$, where $\Delta f=1/NT$ and T is the original symbol period, as shown in FIG. 3. The resulting signal after D/A conversion can be expressed as set forth below in Equation 1:

$$x(t) = \sum_{n=0}^{N-1} X_n e^{j2\pi f_n t}, 0 \# t \# NT \qquad \text{Eq. (1)}$$

The PAP of the transmitted signal from Equation (1) can be defined as shown in Equation (2) below:

$$PAP = \frac{\max|x(t)|^2}{E[|x(t)|^2]} \qquad \text{Eq. (2)}$$

To obtain the partial transmit sequence (PTS), the input data block is partitioned into disjoint sub-blocks or clusters by subsystem 204 which are combined to minimize the PAP. A data block is defined as $\{X_n, n=0, 1, \ldots, N-1\}$, which can be represented as a vector $X=[X_0 X_1 \ldots X_{N-1}]^T$, where T is the symbol period. The vector X is partitioned into a predetermined number M of disjoint sets represented by vectors $\{X_m, m=1,2,\ldots M\}$. The partial transmit sequence technique forms a weighted combination of M clusters as set forth below in Equation 3:

$$X' = \sum_{m=1}^{M} b_m X_m \qquad \text{Eq. (3)}$$

where $\{b_m, m=1, 2, \ldots, M\}$ are phase or weighting factors, which can be pure rotations. In the time domain, this relationship can be represented as shown in Equation 4 below:

$$x' = \sum_{m=1}^{M} b_m x_m \qquad \text{Eq. (4)}$$

The vector $x_m$, which is referred to as the partial transmit sequence, is the Inverse Fast Fourier Transform (IFFT) of vector $X_m$. The phase factors $b_m$ are chosen to minimize the PAP of x', as described below.

The phase factors can be generated in a variety of ways to minimize the PAP of the transmitted OFDM signals, including optimization, iteration, and random generation. For example, a predetermined number of Walsh sequences can be generated.

In one particular embodiment, the phase factors $b_m$ are binary phase factors, i.e., ±1. In an alternative, more complex embodiment, the phase factors include ±1 and ±j. After the input data block is divided into a predetermined number M of clusters, the M N-point partial transmit sequences are formed. For example, an OFDM system having 256 subcarriers can include sixteen (M=16) data clusters each having sixteen subcarriers.

Figure 5:
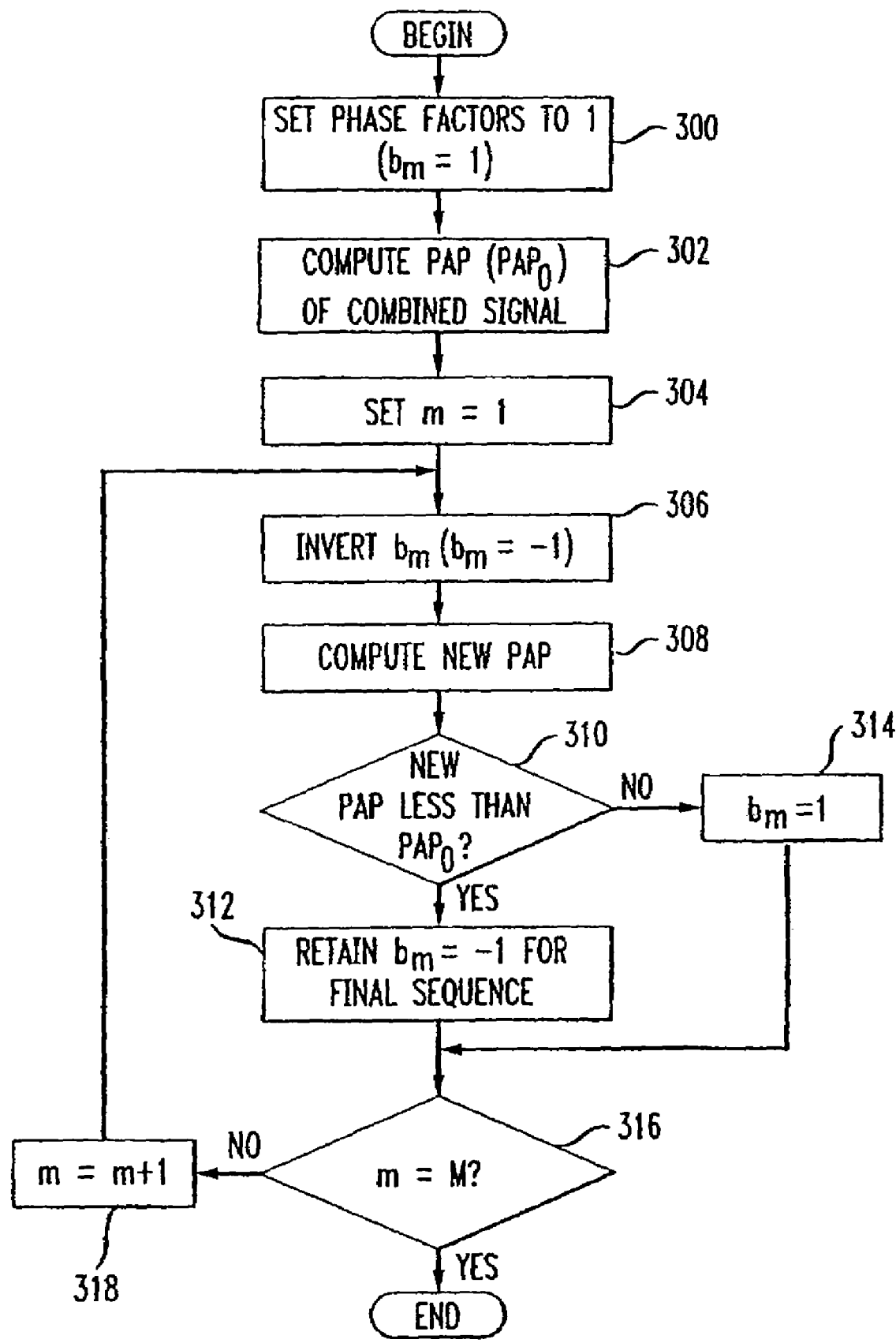
FIG. 5 is a flow diagram of an exemplary sequence of steps for providing an optimal PAP for an OFDM system in accordance with the present invention.

FIG. 5 shows an exemplary sequence of steps for determining binary phase factors for the partial transmit sequence. In step 300, the phase factors $b_m$ are set to be one for all m and in step 302 the PAP ($PAP_0$) of the combined signal with all phase factors set to one is computed. In step 304, the phase factor index m is set to 1.

In step 306, the first phase factor $b_1$ is inverted, i.e., $b_1=-1$, and the PAP is re-computed with inverted phase factor in step 308. In step 310, is it determined whether the new PAP value is lower than the original $PAP_0$. If it is lower, then in step 312 the first phase factor $b_1$ remains minus one as part of the final phase sequence $\{b_m, m=1, \ldots, M\}$. If it is not lower, in step 314 the first phase factor is reset to one, i.e., $b_1=1$. In step 316, the index value M is examined and in step 318 the index value is incremented until each phase factor is determined to be a one or a minus one.

Alternatively, a predetermined number of random sequences, which can be Walsh sequences, are selected. The information sequence is multiplied by a predetermined number of the sequences. The result providing the best PAP characteristics is then selected. This approach approximates an optimum PAP as described in L. J. Cimini. Jr. and N. R. Sollenberger, "Peak-to-Average Power Ration Reduction of an OFDM Signal Using Partial Transmit Sequences," *IEEE Commun. Letts.*, Vol. 4, No. 3, March 2000, pp. 390-393, which is incorporated herein by reference.

Figure 6:
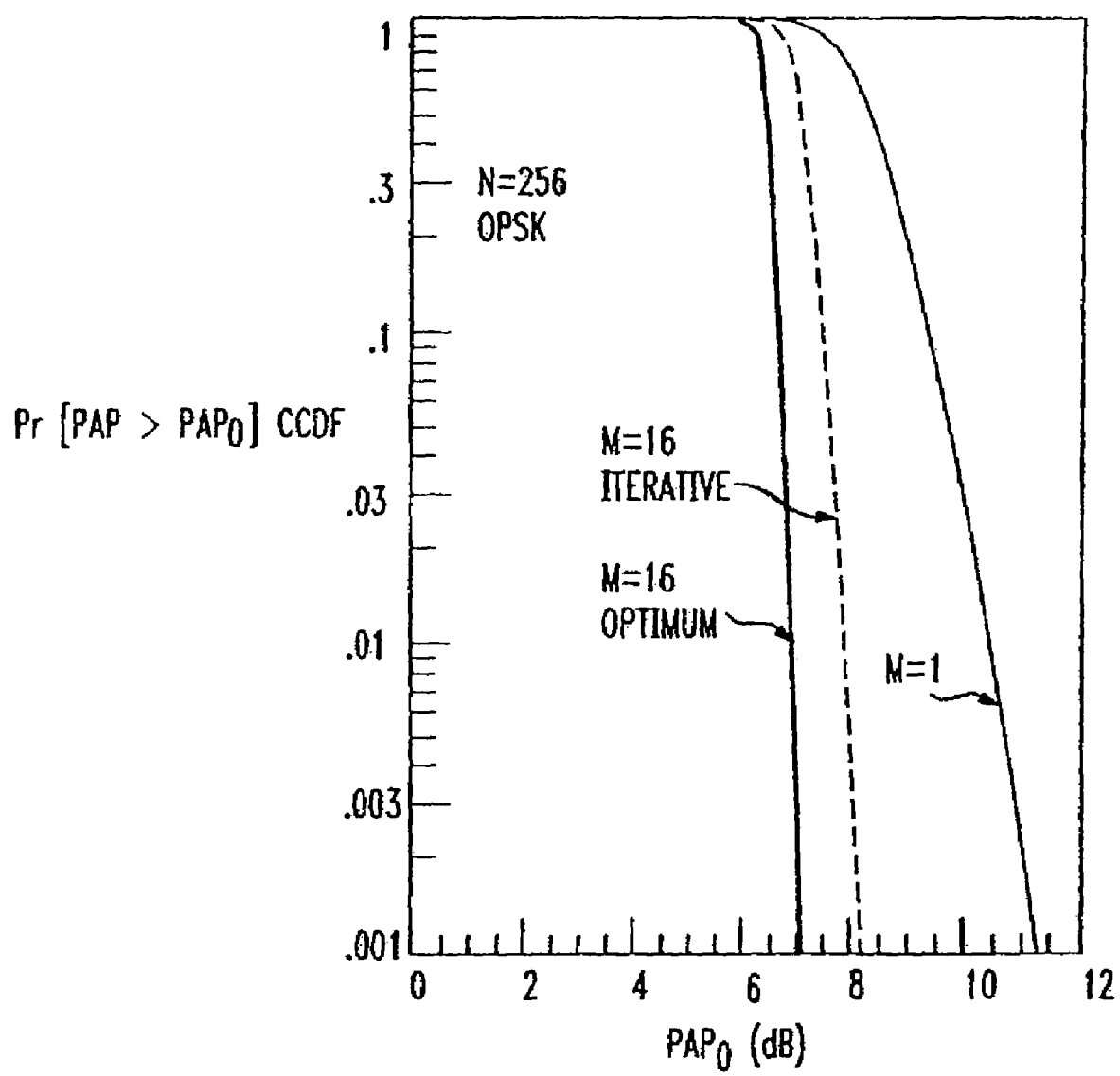
FIG. 6 is a graphical depiction showing the probability of error in detecting an inversion sequence embedded in the transmitted signals in accordance with the present invention.

FIG. 6 shows the PAP versus CCDF simulated results for an OFDM system having 256 subcarriers with the transmitted signal oversampled by a factor of four. QPSK signal modulation is assumed with the energy normalized to unity. Results are shown for the case of a single OFDM block (M=1) and for 16 clusters (M=16) each including 16 subcarriers. The unmodified OFDM signal has a PAP that exceeds 10.4 dB for less than 1% of the blocks. For the suboptimal algorithm using 16 Walsh sequences of length 16 as the inversion sequence, a value of about 8 dB is obtained. By using the PTS approach with the optimum binary phase sequence for combining, the 1% PAP reduces to 6.8 dB. While a degradation of about 1 dB is encountered using the suboptimal approach, the optimization process has been reduced to 16 sets of 16 additions, a significant savings as compared to finding the optimum set of phase factors.

To recover the data, the OFDM system receiver determines the inversion sequence that was embedded in the transmitted signals. In contrast to known systems that send inversion sequencing information as explicit side information (via subcarriers) at the expense of some loss in efficiency, an OFDM system in accordance with the present invention embeds a marker onto the transmitted data that can be used to uniquely identify the inversion sequence at the receiver. The detection of the inversion sequence should be sufficiently reliable so as not to have a significant effect on the overall system performance.

As described above, the OFDM system embeds markers on the transmitted signals. In an exemplary embodiment described above, if the inversion sequence does not rotate the cluster, e.g., $b_m=1$, then no tones in the cluster are rotated. If the inversion sequence rotates the cluster, e.g., $b_m=-1$, then every other tone in that cluster is rotated by π/4 radians. This arrangement is equivalent to using two signal constellations for the data symbols in a cluster: one for the unrotated clusters and another, rotated by π/4, for the modified clusters. This algorithm puts an embedded marker on rotated clusters that can be reliably detected even in the presence of noise and multipath fading with a minimal impact on the overall system performance.

To detect the inversion sequence, the data modulation must first be removed. In an illustrative embodiment, the frequency symbols are raised to the fourth power, which is a standard approach for removing QPSK modulation. Higher-order PSK modulations can be removed in a similar fashion, as is well known to one of ordinary skill in the art. With the modulation removed, the data symbols (in the frequency domain) can be differentially detected by computing, for each cluster, a test statistic as set forth below in Equation 5:

$$Z_m = \sum_{j=1}^{N/M-1} (Y_{j,m} Y_{j+1,m}^*)^4 \qquad \text{Eq. (5)}$$

where $Y_{j,m}$ represents the jth tone in the mth cluster and * denotes conjugation. Thus, in the absence of noise, if cluster m was not altered by the inversion sequence, then the mth test statistic $Z_m$ is +(N/M-I). If $b_m=-1$, then $Z_m$ is -(N/M-1). Therefore, a relatively simple binary detection scheme can recover the inversion sequence. The summation over the tones in a cluster averages the noise and provides a significant performance improvement.

Given the decision statistic in Equation 5, a variety of detection schemes can be used. In one embodiment, the test statistic is quantized to ±1 and decisions are made independently for each cluster. While this approach is relatively simple, there is no straightforward mechanism for correcting errors.

In another embodiment, detection performance is improved by quantizing the individual test statistics $Z_m$ and then decoding the entire sequence to the nearest sequence, e.g., Walsh sequence. Specifically, the system first generates the sequence $\{Re[Z_m], m=1,2, \ldots, M\}$ and quantizes each component to +1 or -1. The system then chooses the Walsh sequence of length M that is closest, in Hamming distance, to the resulting sequence. This technique provides error correction since the received sequence is mapped into one of only M possible Walsh sequences.

In a further embodiment that provides further performance improvements, all of the information in the decision statistics is retained. Therefore, one preferred strategy is to compute the sequence $\{Z_m, m=I2, \ldots, M\}$ and then choose the Walsh sequence of length M that is closest, in Euclidean distance, to the resulting sequence.

The performance of an OFDM system in accordance with the present invention was simulated. The simulated OFDM system includes 256 subcarriers (N=256), which are divided into 16 clusters (i.e., M=16), each having 16 subcarriers. QPSK is used to modulate the tones. Performance is measured by the word error rate (WER), where word corresponds to one OFDM block or, equivalently, the length of one inversion sequence. Initially, results on the detection performance are based upon the probability that the inversion sequence is received in error.

Figure 7:
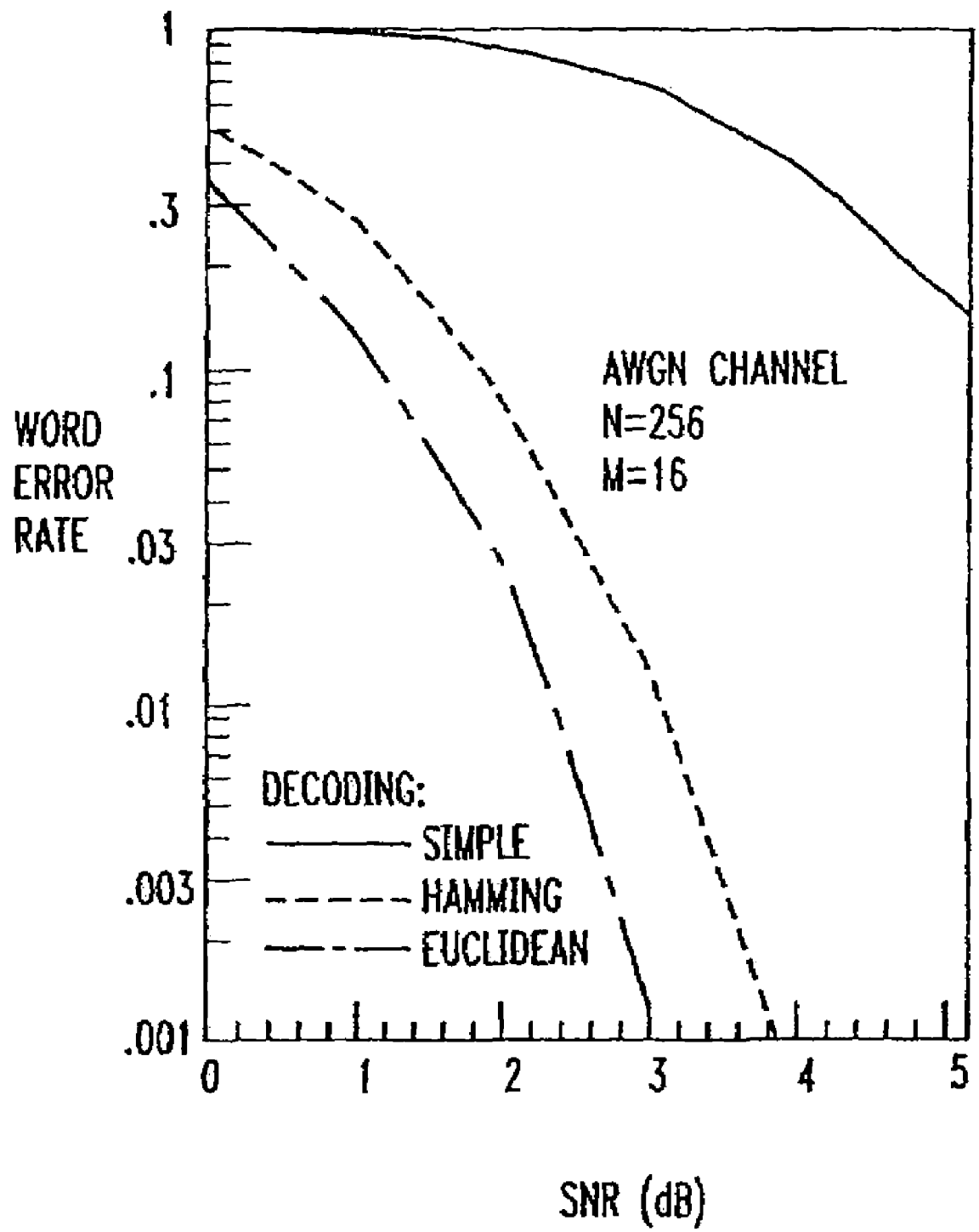
FIG. 7 is a graphical depiction of detection performance for an OFDM system in accordance with the present invention.

FIG. 7 shows the probability of error in detecting the inversion sequence as a function of the signal-to-noise ratio (SNR) in an additive, white, Gaussian noise (AWGN) environment. The simple cluster-by-cluster detection scheme requires the highest SNR for a desired WER. By using minimum distance decoding, whether based on Hamming or Euclidean distances, significant improvements are obtained. The benefit comes from the error correction that is possible with minimum distance decoding. The 16 Walsh sequences of length 16 have a minimum distance of 8 and, as such, can correct up to 4 errors. Using the Hamming (Euclidean) distance, a 1% WER can be achieved with an SNR of about 3.2 dB (2.3 dB).

The present invention provides an OFDM system that provides enhanced PAP statistics with minimal loss in efficiency. The system embeds combining or inversion sequence information without additional overhead. In addition, the embedded inversion sequence can be reliably detected by the receiver. Performance can be further improved by increasing the number of tones per cluster.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for reducing a peak-to-average power (PAP) ratio in a system, comprising:
   dividing a data block into a plurality of clusters;
   determining a respective phase factor for each of the plurality of clusters to form an inversion sequence for reducing the PAP ratio of transmitted data corresponding to the plurality of clusters, wherein said determining is performed independent of a number of said plurality of clusters; and
   embedding the inversion sequence onto the transmitted data, wherein said embedding comprises rotating at least one tone in one of the plurality of clusters.

2. The method according to claim 1, wherein the phase factors are binary phase factors.

3. The method according to claim 1, further including detecting the inversion sequence.

4. A method of embedding peak-to-average power (PAP)-reducing inversion sequences onto transmitted data, comprising:
   determining an initial PAP value for a block of symbols;
   partitioning the block of symbols into a predetermined number of clusters;
   selecting a respective phase factor for each of the clusters so as to form an inversion sequence that reduces a PAP of transmitted data corresponding to the block of symbols, wherein said selecting is performed independent of a number of said plurality of clusters; and
   embedding the inversion sequence onto the transmitted data by rotating selected tones in each of the clusters based upon a value of the associated phase factor.

5. The method according to claim 4, further including employing an iterative process to determine the phase factors.

6. The method according to claim 4, further including approximating an optimal inversion sequence.

7. The method according to claim 4, wherein the phase factors are binary.

8. The method according to claim 4, further including detecting the inversion sequence.

* * * * *